United States Patent
Seki et al.

(10) Patent No.: US 10,107,020 B2
(45) Date of Patent: Oct. 23, 2018

(54) DOOR OPENING DEGREE ADJUSTMENT DEVICE

(71) Applicant: AISIN SEIKI KABUSHIKI KAISHA, Kariya-shi (JP)

(72) Inventors: Tomokazu Seki, Kariya (JP); Shintaro Suzuki, Kasugai (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 6 days.

(21) Appl. No.: 15/128,339

(22) PCT Filed: Mar. 18, 2015

(86) PCT No.: PCT/JP2015/058143
§ 371 (c)(1),
(2) Date: Sep. 22, 2016

(87) PCT Pub. No.: WO2015/146754
PCT Pub. Date: Oct. 1, 2015

(65) Prior Publication Data
US 2017/0241171 A1  Aug. 24, 2017

(30) Foreign Application Priority Data

Mar. 26, 2014  (JP) ................. 2014-064614
Mar. 26, 2014  (JP) ................. 2014-064615
Mar. 26, 2014  (JP) ................. 2014-064616

(51) Int. Cl.
*E05C 17/20* (2006.01)
*E05C 17/28* (2006.01)
(Continued)

(52) U.S. Cl.
CPC .......... *E05C 17/203* (2013.01); *B60J 5/0468* (2013.01); *E05C 17/22* (2013.01); *E05C 17/28* (2013.01); *E05D 11/06* (2013.01)

(58) Field of Classification Search
CPC ........ E05C 17/00; E05C 17/34; E05C 17/345; E05C 17/047; E05C 17/203; E05C 17/28;
(Continued)

(56) References Cited

U.S. PATENT DOCUMENTS 1,749,573 A * 3/1930 Earhart ................ E05C 17/203
                                                                        16/86 R
2,194,287 A * 3/1940 Marsh ................... E05C 17/203
                                                                        16/82
(Continued)

FOREIGN PATENT DOCUMENTS

DE        10013584 A1 * 9/2001 ........... E05C 17/203
JP        48-78630 U       9/1973
(Continued)

OTHER PUBLICATIONS

International Preliminary Report on Patentability and Written Opinion dated Sep. 27, 2016 in PCT/JP2015/058143 (submitting English translation only).
(Continued)

*Primary Examiner* — Emily M Morgan
(74) *Attorney, Agent, or Firm* — Oblon, McClelland, Maier & Neustadt, L.L.P.

(57) ABSTRACT

A door opening degree adjustment device includes a check link having a stopper portion, a guide member having a guide hole, and an adjustment member. The adjustment member includes a plurality of stages of step portions and a guide projection that is inserted in the guide hole movably in the extending direction of the guide hole. The adjustment member causes the stopper portion to contact the step portions of any one of the stages, thereby restricting an opening operation caused by pivoting of the door in one direction. The guide projection is arranged on an extended line that connects the stopper portion to one of the stages of
(Continued)

the step portions that contacts the stopper portion in the direction of the movement of the check link.

10 Claims, 11 Drawing Sheets

(51) Int. Cl.
 *E05C 17/22* (2006.01)
 *B60J 5/04* (2006.01)
 *E05D 11/06* (2006.01)
(58) Field of Classification Search
 CPC .......... E05C 17/22; E05C 17/20; E05C 17/44; E05C 17/04; E05C 17/12
 USPC ................................................ 16/82, 85, 86 B
 See application file for complete search history.

(56) References Cited

U.S. PATENT DOCUMENTS

| | | | | |
|---|---|---|---|---|
| 5,358,225 | A * | 10/1994 | Volpel | E05C 17/305 16/82 |
| 5,727,287 | A * | 3/1998 | Hosken | E05C 17/203 16/334 |
| 7,500,711 | B1 * | 3/2009 | Ewing | E05F 15/622 296/146.1 |
| 7,730,579 | B2 * | 6/2010 | Coe | E05C 17/025 16/49 |
| 8,783,740 | B1 * | 7/2014 | Hurt | E05C 17/16 292/270 |
| 9,032,587 | B2 * | 5/2015 | Adoline | E05F 1/10 16/49 |
| 2001/0013154 | A1 * | 8/2001 | Ng | E05C 17/203 16/82 |
| 2004/0251696 | A1 * | 12/2004 | Murayama | E05C 17/203 292/262 |
| 2008/0271286 | A1 * | 11/2008 | Stalhammar | E05C 17/203 16/84 |
| 2010/0076651 | A1 * | 3/2010 | Nakakura | E05C 17/00 701/49 |
| 2011/0179599 | A1 * | 7/2011 | Nicolas Domingo | E05C 17/203 16/85 |
| 2014/0053370 | A1 | 2/2014 | Tseng et al. | |
| 2016/0010379 | A1 * | 1/2016 | Sauerwein | E05F 5/00 701/49 |
| 2016/0281399 | A1 * | 9/2016 | Seki | E05C 17/22 |
| 2017/0275933 | A1 * | 9/2017 | Seki | E05C 17/22 |

FOREIGN PATENT DOCUMENTS

| | | | | |
|---|---|---|---|---|
| JP | | 2-144225 A | 6/1990 | |
| JP | | 2007-39981 A | 2/2007 | |
| JP | | 2007-231607 A | 9/2007 | |
| JP | | 2014-500418 A | 1/2014 | |
| WO | WO-2017109441 A1 * | | 6/2017 | .......... E05C 17/203 |

OTHER PUBLICATIONS

International Search Report dated Jun. 16, 2015, in PCT/JP15/058143 filed Mar. 18, 2015.

* cited by examiner

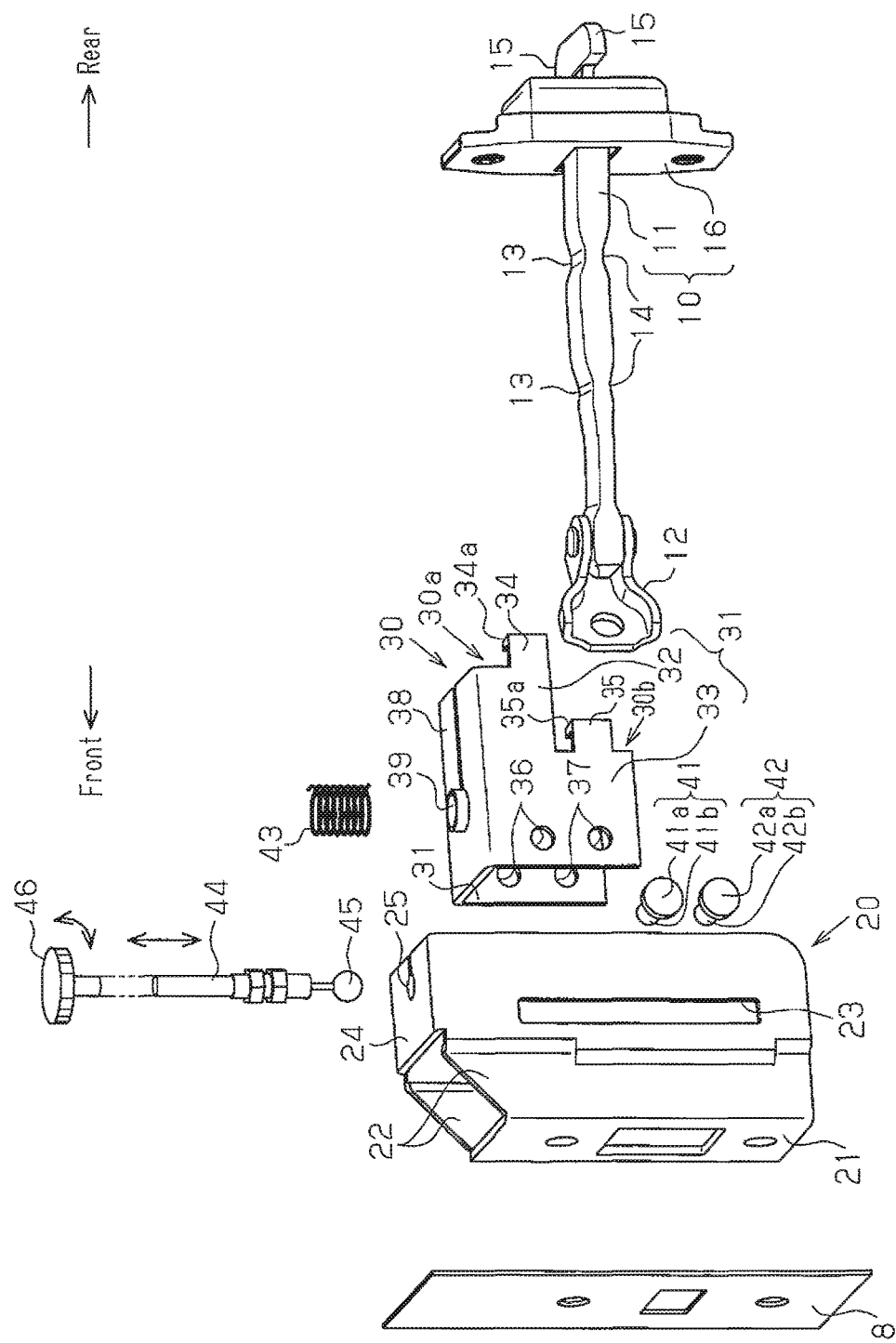

DOOR OPENING DEGREE ADJUSTMENT DEVICE

TECHNICAL FIELD

The present invention relates to a door opening degree adjustment device.

BACKGROUND ART

Typically, a door of a vehicle is pivotally coupled to the body of the vehicle through a hinge and selectively opened and closed by being pivoted about the hinge. A door check mechanism is arranged between the door and the body and the door is held at a certain opening degree by the door check mechanism. That is, the door check mechanism has a check link pivotally coupled to the body and a door check fixed in the door, through which the check link is inserted. The door check mechanism holds the door at the certain opening degree by engaging the door check with the check link and applying resistance force to movement of the door.

For example, to hold a door at a certain opening degree, Patent Document 1 proposes that a fastening mechanism be provided that applies constraint force to movement of a check link.

PRIOR ART DOCUMENT

Patent Document

Patent Document 1: Japanese Laid-Open Patent Publication No. 2007-39981

SUMMARY OF THE INVENTION

Problems that the Invention is to Solve

Regarding such holding of the door, even when the force applied to movement of the check link is adjustable, an opening operation of the door exceeding the opening degree at which the door is held may occur if external force exceeding the force applied to movement of the check link is applied.

Accordingly, it is an objective of the present invention to provide a door opening degree adjustment device capable of further firmly restricting opening of a door exceeding an adjusted opening degree.

Means for Solving the Problems

To achieve the foregoing objective and in accordance with a first aspect of the present invention, a door opening degree adjustment device is provided that includes a check link, a guide member, and an adjustment member. The check link is adapted to be pivotally coupled to a body of a vehicle and to be extended into a door pivotally coupled to the body. The check link has a stopper portion in a distal end. The guide member is adapted to be fixed in the door and includes a guide hole extending in a direction different from a direction of movement of the check link caused by pivoting of the door. The adjustment member includes a plurality of stages of step portions and a guide projection that is inserted in the guide hole movably in the extending direction of the guide hole. The adjustment member causes the stopper portion to contact the step portions of any one of the stages, thereby restricting an opening operation caused by pivoting of the door in one direction. The guide projection is arranged on an extended line that connects the stopper portion to one of the stages of the step portions that contacts the stopper portion in the direction of the movement of the check link.

In accordance with a second aspect of the present invention, a door opening degree adjustment device is provided that includes a check link and an adjustment member. The check link is adapted to be pivotally coupled to a body of a vehicle and to be extended into a door pivotally coupled to the body. The check link has a stopper portion in a distal end. The adjustment member is arranged movably in the door in a direction different from a direction of movement of the check link caused by pivoting of the door. The stopper portion has a plurality of stages of check-side step portions in the direction of the movement of the check link. The adjustment member has a plurality of stages of adjustment-side step portions, wherein the number of stages of the adjustment-side step portions is greater than the number of stages of the check-side step portions. The adjustment member causes the stages of the check-side step portions to contact the stages of the adjustment-side step portions in an engaged state, thereby restricting an opening operation caused by pivoting of the door in one direction.

In accordance with a third aspect of the present invention, a door opening degree adjustment device is provided that includes a check link, a guide member, an adjustment member, an urging member, and a cable. The check link is adapted to be pivotally coupled to a body of a vehicle and to be extended into a door pivotally coupled to the body. The check link has a stopper portion in a distal end. The guide member adapted to be fixed in the door. Movement of the adjustment member in a predetermined movement range in a direction different from a direction of movement of the check link caused by pivoting of the door is guided by the guide member. The adjustment member restricts an opening operation caused by pivoting of the door in one direction by causing the stopper portion to contact the step portion. The urging member urges the adjustment member such that the adjustment member moves toward one of ends of the predetermined movement range. The cable is coupled to the adjustment member. Against urging force of the urging member, the cable holds the adjustment member at a position corresponding to a manipulation amount. The adjustment member has an escape portion that releases the stopper portion when located at the end.

In accordance with a fourth aspect of the present invention, a door opening degree adjustment device is provided that includes a check link, a guide member, an adjustment member, an urging member, and a cable. The check link is adapted to be pivotally coupled to a body of a vehicle and to be extended into a door pivotally coupled to the body, the check link having a stopper portion in a distal end. The guide member adapted to be fixed in the door. Movement of the adjustment member in a predetermined movement range in a direction different from a direction of movement of the check link caused by pivoting of the door is guided by the guide member. The adjustment member restricts an opening operation caused by pivoting of the door in one direction by causing the stopper portion to contact the step portion. The urging member urges the adjustment member such that the adjustment member moves toward a first end, which is one of ends of the predetermined movement range. The cable is coupled to the adjustment member. Against urging force of the urging member, the cable holds the adjustment member at a position corresponding to a manipulation amount. The adjustment member has an escape portion that releases the stopper portion when located at a second end, which is the other end of the predetermined movement range.

BRIEF DESCRIPTION OF THE DRAWINGS

FIG. 5 is an exploded perspective view showing the first embodiment.

MODES FOR CARRYING OUT THE INVENTION

First Embodiment

A door opening degree adjustment device according to a first embodiment of the present invention will now be described. Hereinafter, positions closer to the top and bottom with respect to the height of the vehicle will respectively be represented by the words "above" and "below." The inner side in the vehicle lateral direction facing toward the inside of the passenger compartment will be referred to as a vehicle inner side, and the outer side in the vehicle lateral direction facing toward the outside of the passenger compartment will be referred to as a vehicle outer side. In particular, the vehicle lateral direction (vehicle inner side, vehicle outer side) of the door is mentioned on the assumption that the door is closed.

Figure 1:
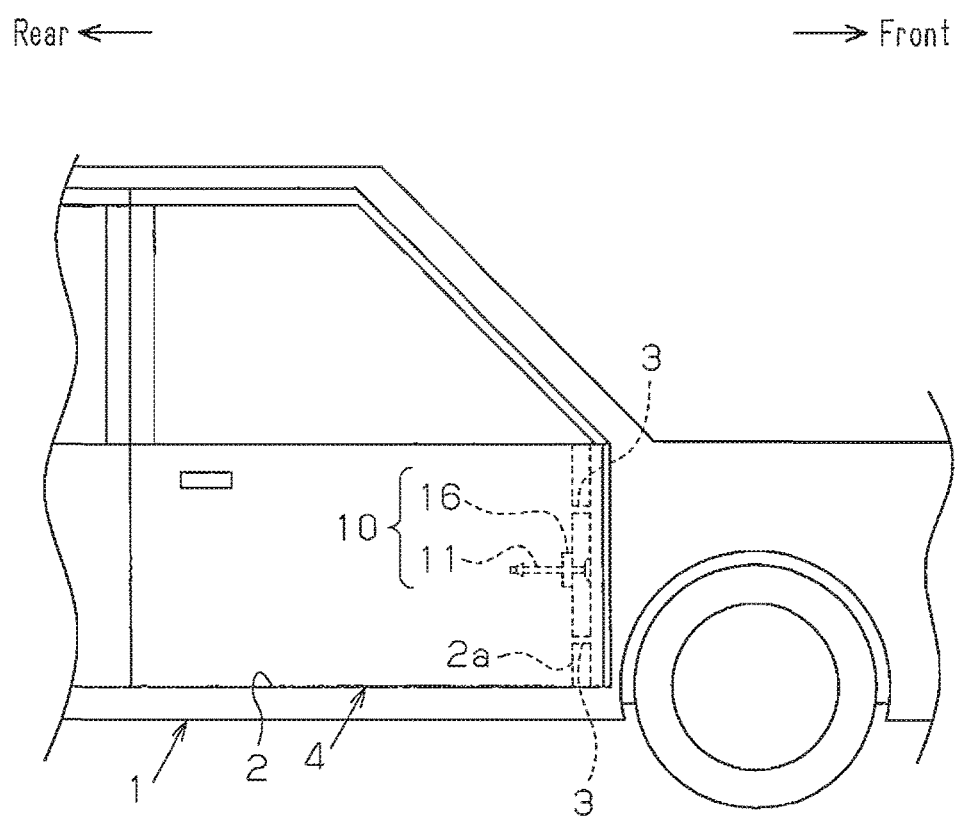
FIG. 1 is a side view showing a vehicle to which a first embodiment is applied.

As shown in FIG. 1, an opening 2 for boarding/alighting is provided in a lateral section of a body 1 of a vehicle. A door 4 is pivotally coupled to a front peripheral section 2a of the opening 2 with a pair of door hinges 3, which is arranged in parallel in the height direction of the vehicle. The door 4 is selectively opened and closed by being pivoted about the door hinges 3 in one direction and the other.

A basal end of a substantially elongated check link 11, which is, for example, a molded member in which plastic is provided integrally with a metal bar, is coupled to the peripheral section 2a to pivot in correspondence with the opening/closing directions of the door 4. A door check 16, through which a distal end of the check link 11 extended into the door 4 is inserted in a longitudinally movable manner, is fastened to the door 4. The check link 11 and the door check 16 configure a door check mechanism 10.

Figure 2A:
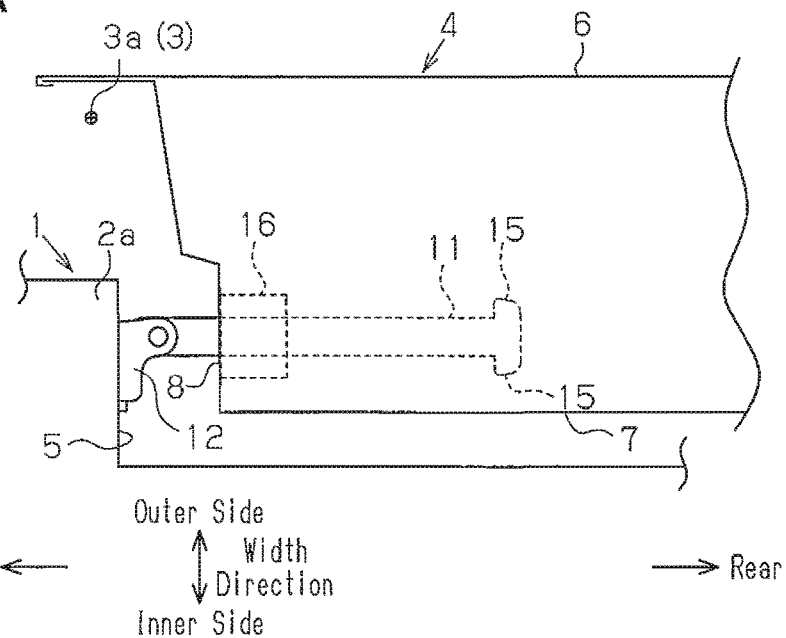
FIGS. 2A and 2B are plan views illustrating operation of the first embodiment.
Figure 2B:
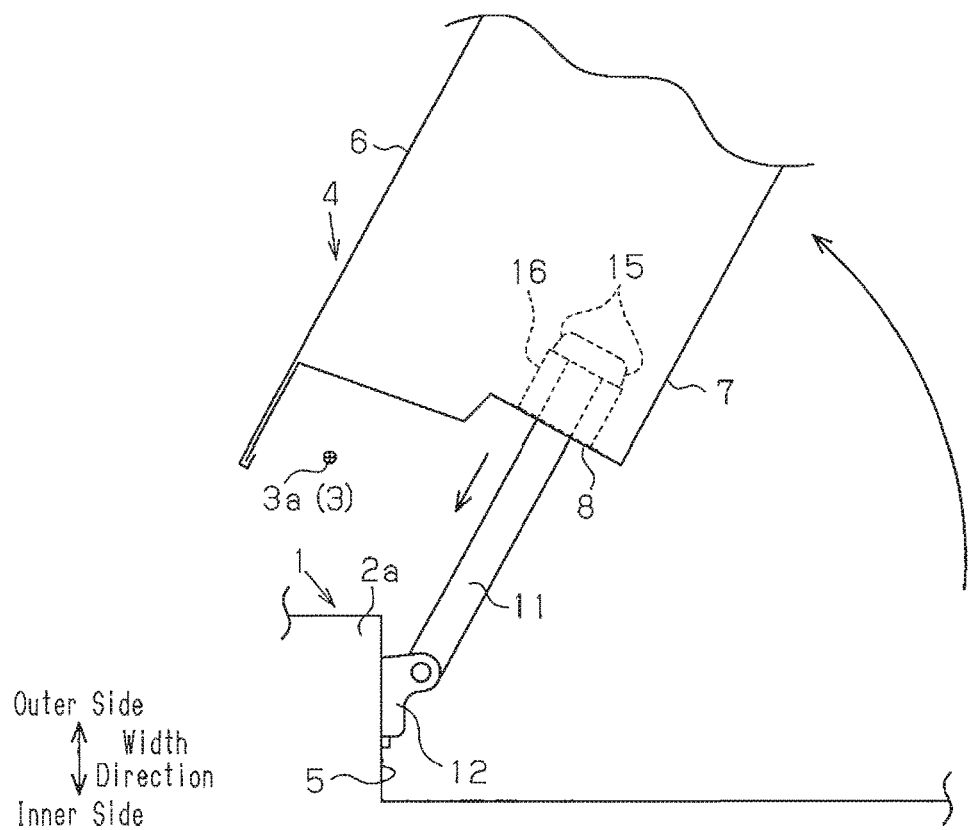

As the door 4 is selectively opened and closed, the check link 11 swings about the basal end of the check link 11 and longitudinally moves relative to the door check 16 (the door 4). That is, as illustrated in FIGS. 2A and 2B, a substantially flat attachment surface 5, which extends toward the vehicle inner side, is provided in the peripheral section 2a. A bracket 12, which is, for example, a metal plate, is fastened to the attachment surface 5. The door 4 has a door outer panel 6, which spreads to face the vehicle outer side, and a box-shaped door inner panel 7, which is arranged on the vehicle inner side with respect to the door outer panel 6. By joining a peripheral end of the door outer panel 6 and an opening end of the door inner panel 7 to each other, a substantially sealed internal space is provided. The door 4 is selectively opened and closed by being pivoted about a shaft 3a of each of the door hinges 3.

The basal end of the check link 11 is coupled to the bracket 12 pivotally about the axis extending in the height direction of the vehicle. A distal end of the check link 11 is extended into the door 4 through a wall portion 8 of the door inner panel 7 facing the attachment surface 5 at a position behind the attachment surface 5. The door check 16 is fastened to the wall portion 8 in the door 4. The distal end of the check link 11, which is adapted to be extended into the door 4, is inserted through the door check 16. Such arrangement causes the check link 11 to swing about the basal end of the check link 11 and longitudinally move relative to the door check 16 as the door 4 is selectively opened and closed. As represented by the change from FIG. 2A to FIG. 2B, in an opening operation of the door 4, for example, the check link 11 is retracted from the door 4 through the door check 16. In contrast, in closing operation of the door 4, the check link 11 is extended into the door 4 through the door check 16. That is, a given position of the check link 11 relative to the door check 16 corresponds to a specific open/closed position (the opening degree) of the door 4. Specifically, the greater the length L of the check link 11, which projects into the door 4 from the door check 16, the smaller the opening degree becomes. In contrast, the smaller the length L, the greater the opening degree becomes.

Figure 3:
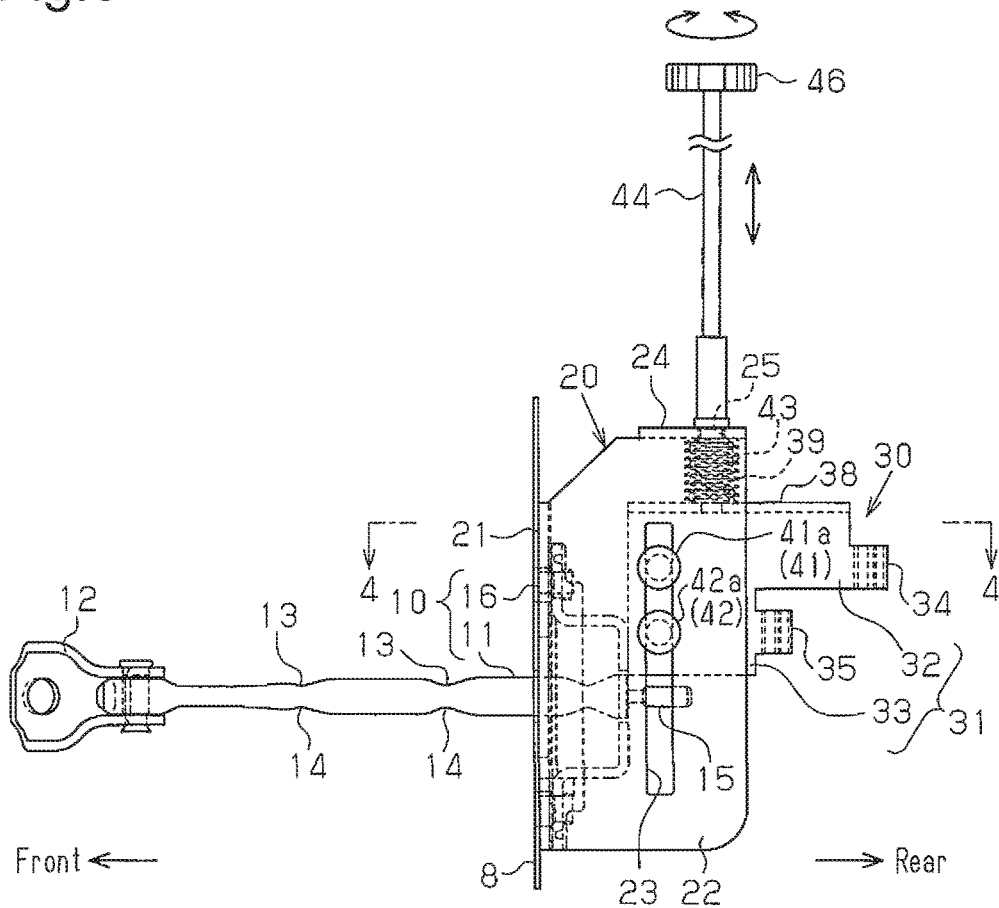
FIG. 3 is a side view showing the first embodiment.

With reference to FIG. 3, pairs of upper and lower valley portions 13, 14 are provided in the check link 11 and spaced apart longitudinally. The door check 16 has two rollers (not shown), which clamp one of the pairs of the valley portions 13, 14 to slightly restrict longitudinal movement of the check link 11. Therefore, in a state in which the longitudinal movement of the check link 11 is slightly restricted by the door check 16, the door 4 is slightly held at a corresponding open/closed position (a corresponding opening degree).

Figure 4:
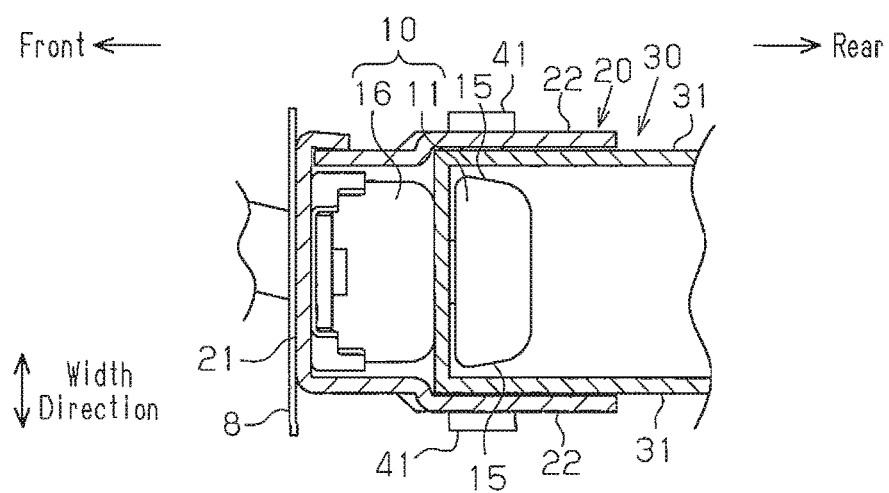
FIG. 4 is a cross-sectional view taken along line 4-4 of FIG. 3.

As also shown in FIG. 4, a pair of projected piece-shaped stopper portions 15, which is extended on opposite sides in the width direction of the vehicle, is provided at the distal end of the check link 11. When the check link 11 is retracted from inside the door 4 through the door check 16 in correspondence with an opening operation of the door 4, the stopper portions 15 contact the door check 16 to restrict a further opening operation of the door 4 (see FIG. 2B). The open/closed position, which is the opening degree, of the door 4 at this time corresponds to a fully open position.

A guide member 20, which is, for example, a metal plate, is attached to the wall portion 8 of the door 4. The guide member 20 has a substantially belt-shaped attaching wall 21, which extends in the height direction of the vehicle, and a pair of support walls 22 extending rearward from the opposite ends (a vehicle-outer-side end and a vehicle-inner-side end) of the attaching wall 21 in the width direction of the vehicle. The guide member 20 has a substantial U shape having an opening facing rearward. With the attaching wall 21 held between the wall portion 8 and the door check 16, the guide member 20 is fastened, or, in other words, jointly fastened, together with the door check 16, to the wall portion 8. The attaching wall 21 has a surface area sufficiently greater than the contact surface of the door check 16 to surround the door check 16.

A substantially rectangular guide hole 23, which extends in the height direction of the vehicle, is provided in each of the support walls 22. The guide member 20 has a top plate portion 24, which connects upper edges of distal ends of the support walls 22 to each other. A substantially circular insertion hole 25, which opens in the height direction of the vehicle, is provided in a middle section of the top plate portion 24.

As illustrated also in FIG. 5, an adjustment member 30, which is, for example, a metal plate, is supported by the guide member 20 in a state held between the support walls 22. The adjustment member 30 has a pair of adjustment walls 31, which extends in correspondence with inner wall surfaces of the support walls 22. Basically, the distance between the adjustment walls 31 in the width direction of the vehicle is set greater than the distance between the distal ends of the stopper portions 15 of the check link 11. Each of the adjustment walls 31 is molded substantially in an L shape such that the rearward extending length of an upper end 32 is greater than the rearward extending length of a lower end 33. The adjustment walls 31 have corresponding substantially L-shaped extended pieces 34, which are extended further rearward from the lower ends of the associated upper ends 32 and bent from the rear ends of the extended pieces 34 to approach each other in the width direction of the vehicle. A rear end surface of each of the extended pieces 34 forms a step portion 34a of a first stage. Also, the adjustment walls 31 have corresponding substantially L-shaped extended pieces 35, which are extended further rearward from middle sections of the associated lower ends 33 in the height direction of the vehicle and bent from the rear ends of the extended pieces 35 to approach each other in the width direction of the vehicle. A rear end surface of each of the extended pieces 35 forms a step portion 35a of a second stage. That is, the distance between the adjustment walls 31 in the width direction of the vehicle becomes smaller at the positions corresponding to the step portions 34a, 35a. The distance between the step portions 34a in the width direction of the vehicle and the distance between the step portions 35a in the same direction are equal to each other and set smaller than the distance between the distal ends of the stopper portions 15 of the check link 11. Obviously, the step portions 35a of the second stage are located forward and below the step portions 34a of the first stage.

The distance between the adjustment walls 31 in the width direction of the vehicle is set greater than the distance between the distal ends of the stopper portions 15 of the check link 11 at a position above the step portions 34a and a position below the step portions 35a. The adjustment member 30 forms an upper escape portion 30a with the space defined between the adjustment walls 31 at the position above the step portions 34a and below a top plate portion 38. The adjustment member 30 also forms a lower escape portion 30b with the space defined between the adjustment walls 31 at the position below the step portions 35a. The space below the step portions 35a, which forms the lower escape portion 30b, includes the range defined by extending the adjustment walls 31 downward. That is, the lower escape portion 30b includes the range below the adjustment walls 31.

Two substantially circular attachment holes 36, 37 are provided in each of the adjustment walls 31 in a state spaced apart in the height direction of the vehicle. Each of the attachment holes 36, 37 is arranged in front of the corresponding one of the extended pieces 34, 35 (the corresponding one of the step portions 34a, 35a). The inner diameter of each attachment hole 36, 37 is set equal to the opening width of each guide hole 23 in the transverse direction. The adjustment member 30 also has the top plate portion 38, which connects upper edges of the adjustment walls 31 (the upper ends 32) to each other. A substantially circular insertion hole 39, which opens in the height direction of the vehicle, is provided in a middle section of the top plate portion 38.

The adjustment member 30 is supported by the guide member 20 at each adjustment wall 31 in a manner movable in the height direction of the vehicle through a pair of guide pins 41, 42 serving as guide projections arranged in parallel in the height direction of the vehicle. That is, the guide pin 41 and the guide pin 42 have a substantially disk-shaped head portion 41a and a substantially disk-shaped head portion 42a, respectively, each of which has a diameter greater than the opening width of each guide hole 23 in the transverse direction. The guide pin 41 and the guide pin 42 also have a substantially columnar inserting portion 41b and a substantially columnar inserting portion 42b, respectively, each of which has a diameter equal to the opening width of the guide hole 23 in the transverse direction and projects from a central section of the associated one of the head portions 41a, 42a. The inserting portions 41b, 42b of the guide pins 41, 42, which are inserted in the guide holes 23 from outside the support walls 22, are inserted through and fastened to the corresponding attachment holes 36, 37 such that the adjustment member 30 is supported by the guide member 20. At this time, the adjustment member 30 is movable with respect to the guide member 20 in the height direction of the vehicle in the range from the position at which each inserting portion 41b contacts the upper end of the associated guide hole 23 to the position at which each inserting portion 42b contacts the lower end of the guide hole 23. That is, a lower end (one of ends, which is a first end) of the movement range of the adjustment member 30 with respect to the guide member 20 is determined by the position at which each inserting portion 42b contacts the lower end (the end) of the corresponding guide hole 23. An upper end (one of ends, which is a second end) of the movement range of the adjustment member 30 with respect to the guide member 20 is determined by the position at which each inserting portion 41b contacts the upper end (the end) of the corresponding guide hole 23.

The insertion hole 39 of the adjustment member 30 is set such that the insertion hole 39 and the insertion hole 25 of the guide member 20 are arranged substantially concentric with each other and face each other in the height direction of the vehicle. A compression spring 43, which serves as an urging member and is, for example, a coil spring, is arranged between the top plate portions 24, 38. The opposite ends of the compression spring 43 contact peripheral edge sections of the corresponding insertion holes 25, 39 each in a pressed manner. The compression spring 43 thus constantly urges the adjustment member 30 below the guide member 20.

A lower terminal 45 of a cable 44, which extends basically in the height direction of the vehicle, is inserted into the insertion holes 25, 39 sequentially, together with the compression spring 43. The terminal 45 is stopped from separating by the top plate portion 38 at a position below the insertion hole 39. An upper terminal of the cable 44 is connected to an adjustment dial 46, which is exposed onto, for example, the door trim in the passenger compartment. By turning the adjustment dial 46, the distance between the top plate portion 24 and the terminal 45 in the height direction of the vehicle is adjusted. That is, the door opening degree adjustment device includes the adjustment dial 46 serving as a manipulation member by which movement of the adjustment member 30 is manually manipulated.

When the adjustment dial 46 is turned in one direction to decrease the distance between the top plate portion 24 and the terminal 45, the adjustment member 30, which is urged downward by the compression spring 43, is raised with respect to the guide member 20. In contrast, when the adjustment dial 46 is turned in the reverse direction to increase the distance between the top plate portion 24 and the terminal 45, the adjustment member 30 is lowered with respect to the guide member 20. At this time, movement of the adjustment member 30 is guided through slide of the guide pins 41, 42 in the associated guide holes 23. The adjustment dial 46 may be configured in any suitable manner as long as the adjustment dial 46 has a known mechanism that is turned to selectively wind and unwind the cable 44, for example.

Operation of the first embodiment will hereafter be described.

Figure 6A:
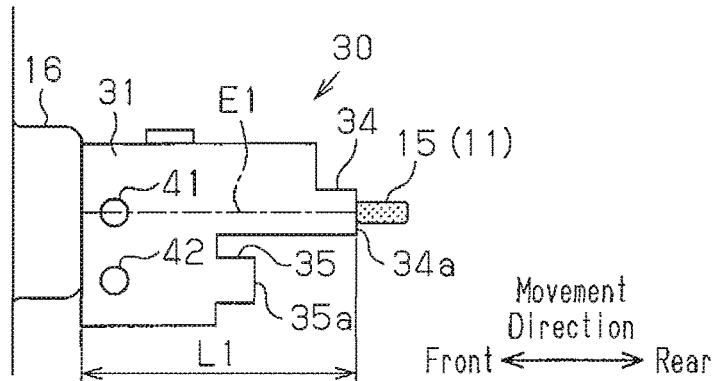
FIGS. 6A to 6C are side views illustrating operation of the first embodiment.

As illustrated in FIG. 6A, the adjustment dial 46 may be turned to adjust the position of the adjustment member 30 such that each extended piece 34 (each step portion 34a of the first stage) is arranged on a forward movement path of the check link 11. In this state, an opening operation of the door 4 is restricted by contact between the stopper portions 15 of the check link 11, which is retracted from inside the door 4 in correspondence with the opening operation, and the corresponding step portions 34a of the first stage. At this time, the length L of the check link 11, which projects from the door check 16 into the door 4, is the length L1. The opening operation of the door 4 is thus restricted at a first opening degree. Each guide pin 41 is arranged on an extended line E1, which connects the corresponding stopper portion 15 and the associated step portion 34a of the first stage to each other in the movement direction of the check link 11. The load input from the stopper portion 15 to the step portion 34a of the first stage is thus supported by the guide pin 41 and the guide hole 23 in the acting direction of the load.

Figure 6B:
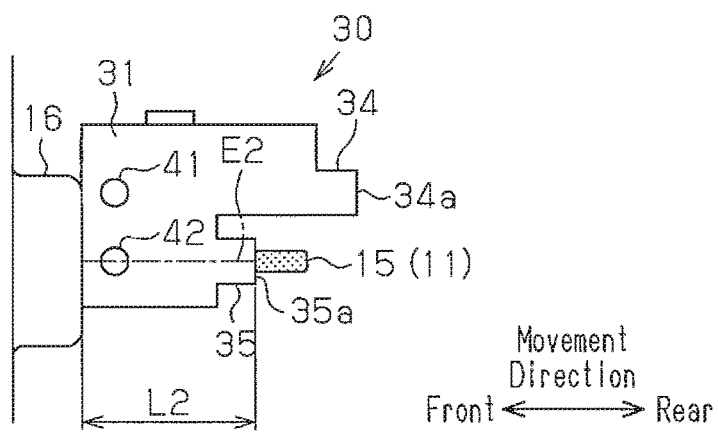

With reference to FIG. 6B, the adjustment dial 46 may be turned to adjust the position of the adjustment member 30 such that each extended piece 35 (each step portion 35a of the second stage) is arranged on a forward movement path of the check link 11. In this state, an opening operation of the door 4 is restricted by contact between the stopper portions 15 of the check link 11, which is retracted from inside the door 4 in correspondence with the opening operation, and the corresponding step portions 35a of the second stage. At this time, the length L of the check link 11, which projects from the door check 16 into the door 4, is the length L2 (L2<L1). The opening operation of the door 4 is thus restricted at a second opening degree, which is greater than the first opening degree. Each guide pin 42 is arranged on an extended line E2, which connects the corresponding stopper portion 15 and the associated step portion 35a of the second stage to each other in the movement direction of the check link 11. The load input from the stopper portion 15 to the step portion 35a of the second stage is thus supported by the guide pin 42 and the guide hole 23 in the acting direction of the load.

Figure 6C:
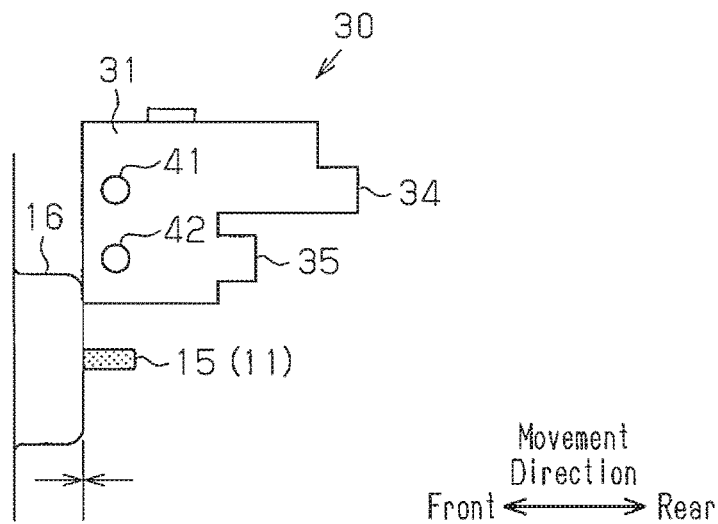

Referring to FIG. 6C, the adjustment dial 46 may be turned to adjust the position of the adjustment member 30 such that the adjustment member 30 (precisely, each extended piece 35) is arranged at a position above the door check 16. In this state, an opening operation of the door 4 is restricted by contact between each stopper portion 15 of the check link 11, which is retracted from inside the door 4 in correspondence with the opening operation, and the door check 16. At this time, the length L of the check link 11, which projects from the door check 16 into the door 4, is zero and the opening operation of the door 4 is restricted at a fully open position.

Figure 7A:
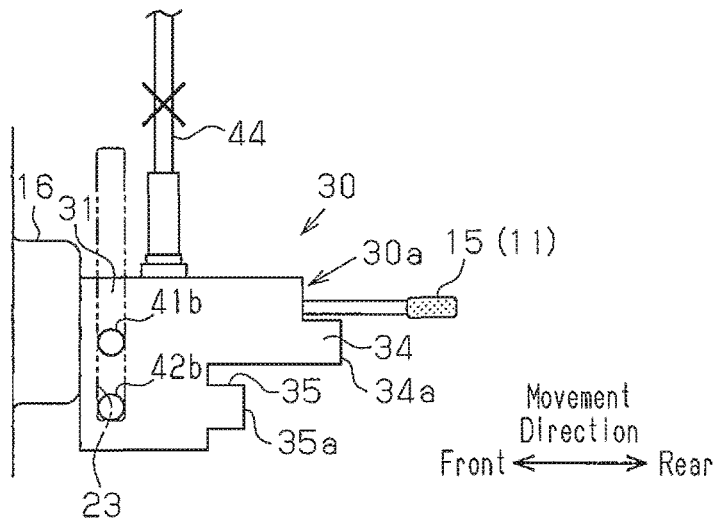
FIGS. 7A and 7B are side views illustrating operation of the first embodiment.

As shown in FIG. 7A, the stopper portions 15 are set to be arranged in the upper escape portion 30a if each inserting portion 41b is located at the lower end of the associated guide hole 23. That is, in this state, the stopper portions 15 are released from the adjustment member 30 by means of the upper escape portion 30a to cancel the restriction of the opening operation of the door 4 by contact between the stopper portions 15 and the adjustment member 30. Therefore, if the cable 44 breaks due to, for example, a car crash and the adjustment member 30, which is urged by the compression spring 43, moves until the inserting portions 41b reach the lower ends of the associated guide holes 23, the restriction of the opening operation of the door 4 is automatically canceled.

Figure 7B:
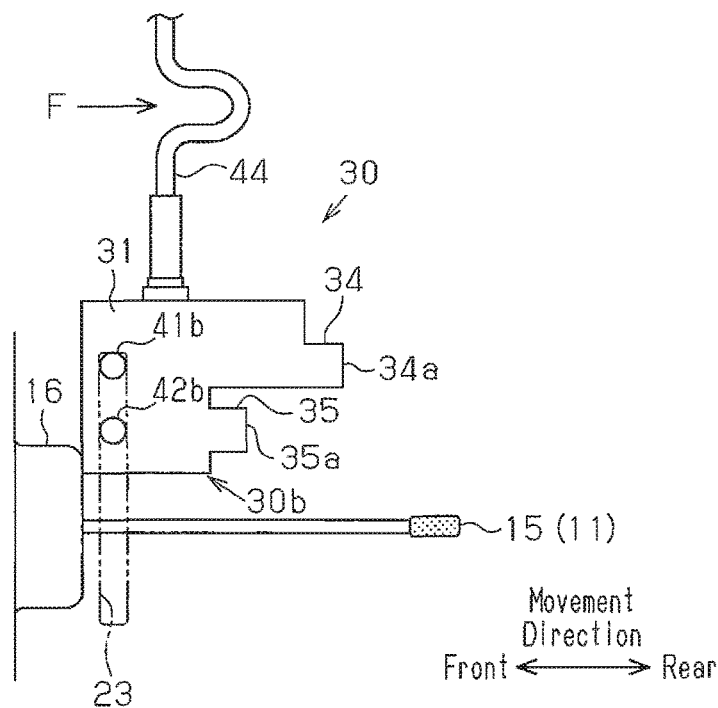
Figure 8:
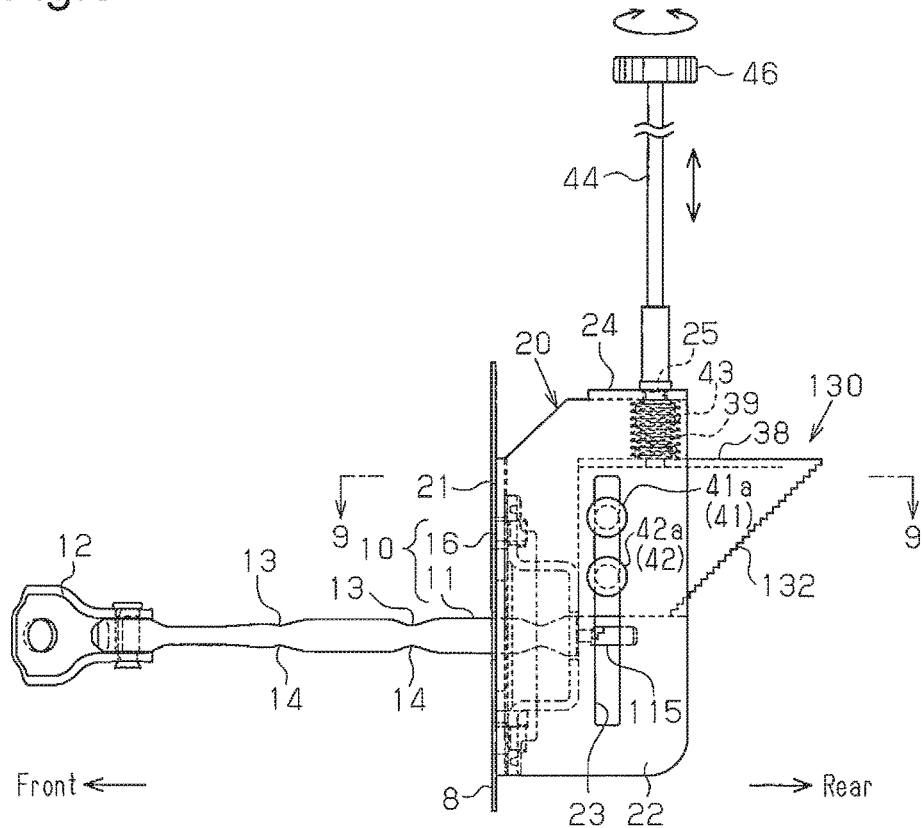
FIG. 8 is a side view showing a second embodiment.

With reference to FIG. 7B, the stopper portions 15 are set to be arranged in the lower escape portion 30b if each inserting portion 41b is located at the upper end of the associated guide hole 23. That is, in this state, the stopper portions 15 are released from the adjustment member 30 by means of the lower escape portion 30b to cancel the restriction of the opening operation of the door 4 by contact between the stopper portions 15 and the adjustment member 30. Therefore, if the cable 44 flexes due to load F caused by, for example, a car crash and the adjustment member 30 moves against the urging force of the compression spring 43 until the inserting portions 41b reach the upper ends of the associated guide holes 23, the restriction of the opening operation of the door 4 is automatically canceled.

As described above, the present embodiment has the following advantages.

(1) In the first embodiment, the opening operation caused by pivoting of the door 4 in one direction is restricted by contact between each stopper portion 15 of the check link 11 and the corresponding one of the step portions 34a, 35a of the adjustment member 30. By moving the adjustment member 30 while moving the guide pins 41, 42 in the associated guide holes 23, the step portion that each stopper portion 15 contacts is switched between the step portion 34a and the step portion 35a such that the maximum opening degree of the door 4 is adjusted.

In this case, the guide pins 41, 42 (the inserting portions 41b, 42b) are inserted in the associated guide holes 23 of the guide member 20, which is fixed in the door 4. This allows the adjustment member 30, which the stopper portions 15 contact, to further firmly restrict opening of the door exceeding an adjusted opening degree.

Particularly, the guide pins 41, 42 are arranged on the corresponding extended lines E1, E2, each of which connects the stopper portion 15 and the corresponding one of the step portions 34a, 35a that the stopper portion 15 contacts in the movement direction of the check link 11. Therefore, in a state in which each stopper portion 15 contacts the corresponding step portion 34a, 35a, the load input from the stopper portion 15 to the step portion 34a, 35a is supported by the guide pin 41, 42 and the guide hole 23 in the acting direction of the load. Opening of the door 4 exceeding an adjusted opening degree is thus further firmly restricted.

(2) In the first embodiment, the guide member 20 is attached to the wall portion 8 of the door 4 with the attaching wall 21 held in contact with the wall portion 8. The load input from each stopper portion 15 to the corresponding step portion 34a, 35a is thus input from the attaching wall 21 to the wall portion 8 through the associated guide pin 41, 42 and the guide hole 23. In this case, the wall portion 8 receives the load from the entire surface of the attaching wall 21, which contacts the wall portion 8. This increases the holding strength of the wall portion 8, compared to, for example, a case in which the wall portion 8 receives the load in a manner concentrated on one section.

(3) In the first embodiment, the opening operation caused by pivoting of the door 4 in one direction is restricted at the fully open position by contact between the stopper portions 15, which are in a state released from the adjustment member 30 (the step portions 34a, 35a), and the door check 16. At this time, the load input from the stopper portions 15 to the door check 16 is input to the wall portion 8 through the attaching wall 21. In this case, the wall portion 8 receives the load from the entire surface of the attaching wall 21, which contacts the wall portion 8. This increases the holding strength of the wall portion 8, compared to, for example, a case in which the wall portion 8 receives the load from the door check 16 in a concentrated manner.

(4) In the first embodiment, the adjustment member 30 has the pair of the adjustment walls 31 in which the step portions 34a, 35a and the guide pins 41, 42 are arranged such that the check link 11 can be held between the adjustment walls 31 in the width direction of the vehicle, or, in other words, the parallel-arrangement direction, which is different from the movement direction of the check link 11 and the extending direction of each guide hole 23. The guide member 20 has the pair of the support walls 22 having the corresponding guide holes 23 such that the adjustment member 30 is held between the support walls 22 in the width direction of the vehicle. The check link 11 has the pair of the stopper portions 15 such that the stopper portions 15 can contact either the step portions 34a or the step portions 35a of the adjustment walls 31.

Therefore, the opening operation of the door 4 is restricted by contact between the stopper portions 15 of the check link 11 and either the step portions 34a or the step portions 35a of the adjustment walls 31. Further, the guide pins 41, 42 are inserted in the associated guide holes 23 with the adjustment member 30, which the stopper portions 15 contact, held between the support walls 22. This allows the adjustment member 30 to further firmly restrict opening of the door 4 exceeding an adjusted opening degree.

In this case, the stopper portions 15 contact the corresponding adjustment walls 31 (the corresponding step portions 34a, 35a), between which the check link 11 is held in the width direction of the vehicle. The check link 11 thus further stabilizes the posture of the check link 11. Further, the guide pins 41, 42 are inserted in the guide holes 23 of the support walls 22, between which the adjustment member 30 is held in the width direction of the vehicle. This allows the guide member 20 to further firmly support the load input from the stopper portions 15 to the adjustment member 30 in a double-supported state.

(5) In the first embodiment, the inserting portions 41b, 42b of the guide pins 41, 42, which are inserted in the guide holes 23 from outside the support walls 22 of the guide member 20, are inserted into and fastened to the attachment holes 36, 37 of the adjustment walls 31 of the adjustment member 30. The adjustment member 30 is thus assembled with the guide member 20. Therefore, assembling performance of the adjustment member 30 is not hampered even though each guide hole 23 has a closed shape having an opening only in the thickness direction of the associated support wall 22.

(6) In the first embodiment, by adjusting the maximum opening degree of the door 4, the door 4 is opened safely even in, for example, a narrow space.

(7) In the first embodiment, the opening operation caused by pivoting of the door 4 in one direction is restricted by contact between the stopper portions 15 of the check link 11 and either the step portions 34a or the step portions 35a of the adjustment member 30. By manipulating (selectively winding and unwinding) the cable 44, the adjustment member 30 is moved while moving the guide pins 41, 42 in the associated guide holes 23. In this manner, the step portion that each stopper portion 15 contacts is switched between the step portion 34a and the step portion 35a to adjust the maximum opening degree of the door 4. In this case, the guide pins 41, 42 (the inserting portions 41b, 42b) are inserted in the associated guide holes 23 of the guide member 20, which is fixed in the door 4. The adjustment member 30, which the stopper portions 15 contact, is thus allowed to further firmly restrict opening of the door exceeding an adjusted opening degree.

Particularly, when the guide pins 42 are located at the lower ends of the associated guide holes 23, the stopper portions 15 are released from the adjustment member 30 by means of the upper escape portion 30a. This cancels the restriction of the opening operation of the door 4 by contact between the stopper portions 15 and the adjustment member 30. Therefore, if the cable 44 breaks due to a car crash or again deterioration, for example, and the adjustment member 30, which is urged by the compression spring 43, moves until the guide pins 42 reach the lower ends of the guide holes 23, the restriction of the opening operation of the door 4 is automatically canceled. The door 4 is thus further reliably opened to the fully open position.

(8) In the first embodiment, when the guide pins 41 are located at the upper ends of the associated guide holes 23, the stopper portions 15 are released from the adjustment member 30 by means of the lower escape portion 30b. This cancels the restriction of the opening operation of the door 4 by contact between the stopper portions 15 and the adjustment member 30. Therefore, if the cable 44 flexes due to, for example, a car crash, particularly, a side crash, and the adjustment member 30 moves against the urging force of the compression spring 43 until the guide pins 41 reach the upper ends of the guide holes 23, the restriction of the opening operation of the door 4 is automatically canceled. The door 4 is thus further reliably opened to the fully open position.

(9) In the first embodiment, the compression spring 43 is arranged between the top plate portion 24 of the guide member 20 and the top plate portion 38 of the adjustment member 30. This restrains rattling of the adjustment member 30 caused by, for example, vibration of the vehicle. Also, the posture of the adjustment member 30 is further firmly held even if the posture of the vehicle is inclined.

(10) In the first embodiment, when the guide pins 41 are located at the upper ends of the associated guide holes 23, the stopper portions 15 are located below the adjustment member 30. Therefore, even if the cable 44 flexes insufficiently, the restriction of the opening operation of the door 4 is canceled as long as at least the stopper portions 15 are located below the extended pieces 35, or, in other words, located in the lower escape portion 30b.

(11) In the first embodiment, the ends of the movement range of the adjustment member 30 with respect to the guide member 20 are determined by locating the guide pins 41, 42 at the corresponding ends of the associated guide holes 23. It is thus unnecessary to add a separate component to determine the ends of the movement range. The number of the components is thus decreased.

Second Embodiment

A second embodiment of the door opening degree adjustment device will hereafter be described with reference to FIGS. 8 to 13B. Same or like reference numerals are given to components of the second embodiment that are the same as or like corresponding components of the first embodiment and description of these components is omitted herein. The second embodiment will thus be described mainly on the difference from the first embodiment. The second embodiment is different from the first embodiment in terms of the configuration of the adjustment member and the configuration of the stopper portion.

Figure 9:
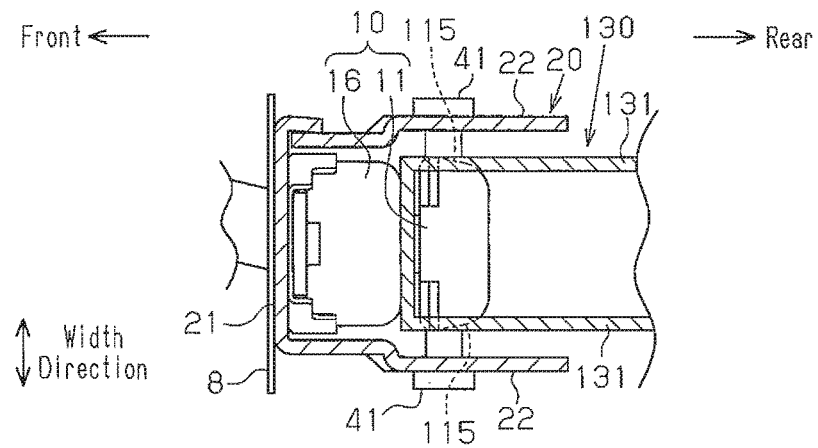
FIG. 9 is a cross-sectional view taken along line 9-9 of FIG. 8.

As illustrated in FIG. 9, a pair of projected piece-shaped stopper portions 115 extended on the opposite sides in the width direction of the vehicle is provided at the distal end of the check link 11. When the check link 11 is retracted from inside the door 4 through the door check 16 in correspondence with an opening operation of the door 4, the stopper portions 115 contact the door check 16 to restrict a further opening operation of the door 4 (see FIG. 2B). The open/closed position (the opening degree) of the door 4 at this time corresponds to the fully open position.

The guide member 20, which is, for example, a metal plate, is attached to the wall portion 8 of the door 4. The guide member 20 has the substantially belt-shaped attaching wall 21, which extends in the height direction of the vehicle, and the pair of the support walls 22 extending rearward from the opposite ends (the vehicle-outer-side end and the vehicle-inner-side end) of the attaching wall 21 in the width direction of the vehicle. The guide member 20 has the substantial U shape having an opening facing rearward. With the attaching wall 21 held between the wall portion 8 and the door check 16, the guide member 20 is fastened (in other words, jointly fastened), together with the door check 16, to the wall portion 8.

The substantially square guide hole 23, which extends in the height direction of the vehicle, is provided in each of the support walls 22. The guide member 20 has the top plate portion 24, which connects the upper edges of the distal ends of the support walls 22 to each other. The substantially circular insertion hole 25, which opens in the height direction of the vehicle, is provided in the middle section of the top plate portion 24.

Figure 10:
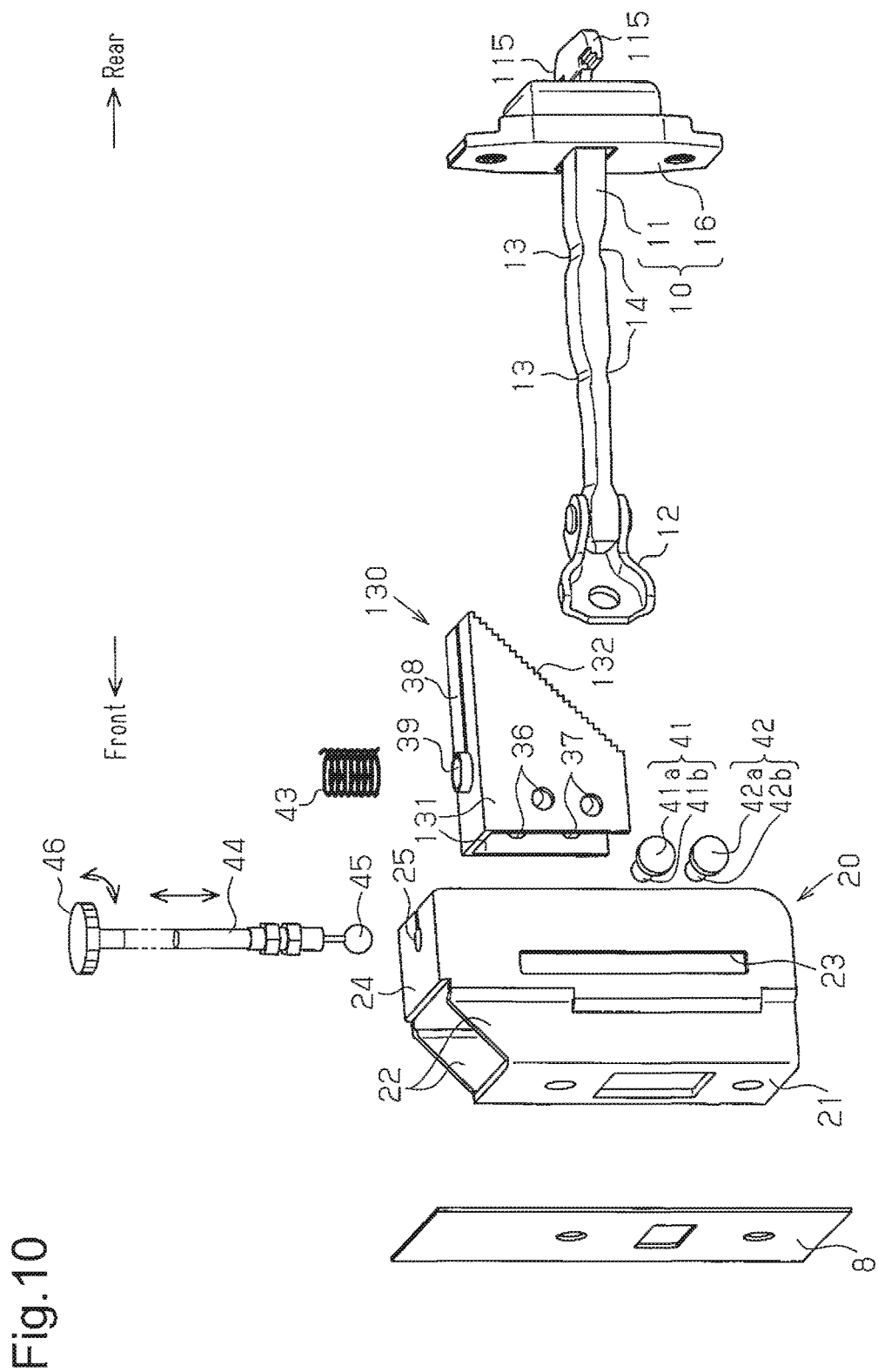
FIG. 10 is an exploded perspective view showing the second embodiment.

As illustrated in FIG. 10, an adjustment member 130, which is, for example, a metal plate, is supported by the guide member 20 in a state held between the support walls 22. The adjustment member 130 has a pair of substantially trapezoidal adjustment walls 131 extending in correspondence with the inner wall surfaces of the support walls 22. The distance between the adjustment walls 131 in the width direction of the vehicle is set smaller than the distance between the distal ends of the stopper portions 115 of the check link 11. The rear end of each of the adjustment walls 131 forms an inclined portion 132, which is inclined forward in the downward direction.

The substantially circular attachment holes 36, 37 are provided in each of the adjustment walls 131 in a state spaced apart in the height direction of the vehicle. The inner diameter of each attachment hole 36, 37 is set equal to the opening width of each guide hole 23 in the transverse direction. The adjustment member 130 also has the top plate portion 38, which connects the upper edges of the adjustment walls 131 to each other. The substantially circular insertion hole 39, which opens in the height direction of the vehicle, is provided in the middle section of the top plate portion 38.

The adjustment member 130 is supported by the guide member 20 at each adjustment wall 131 in a manner movable in the height direction of the vehicle by the pair of the guide pins 41, 42 arranged in parallel in the height direction of the vehicle. That is, the guide pin 41 and the guide pin 42 have the substantially disk-shaped head portion 41a and the substantially disk-shaped head portion 42a, respectively, each of which has a diameter greater than the opening width of each guide hole 23 in the transverse direction. The guide pin 41 and the guide pin 42 also have the substantially columnar inserting portion 41b and the substantially columnar inserting portion 42b, respectively, each of which has a diameter equal to the opening width of the guide hole 23 in the transverse direction and projects from the central section of the associated one of the head portions 41a, 42a. The inserting portions 41b, 42b of the guide pins 41, 42, which are inserted in the guide holes 23 from outside the support walls 22, are inserted through and fastened to the corresponding attachment holes 36, 37 such that the adjustment member 130 is supported by the guide member 20. At this time, the adjustment member 130 is movable with respect to the guide member 20 in the height direction of the vehicle in the range from the position at which each inserting portion 41b contacts the upper end of the associated guide hole 23 to the position at which each inserting portion 42b contacts the lower end of the guide hole 23.

The insertion hole 39 of the adjustment member 130 is set such that the insertion hole 39 and the insertion hole 25 of the guide member 20 are arranged substantially concentric with each other and face each other in the height direction of the vehicle. The compression spring 43, which is, for example, a coil spring, is arranged between the top plate portions 24, 38. The opposite ends of the compression spring 43 contact the peripheral edge sections of the corresponding insertion holes 25, 39 in a pressed manner. The compression spring 43 thus constantly urges the adjustment member 130 below the guide member 20.

The lower terminal 45 of the cable 44, which extends basically in the height direction of the vehicle, is inserted into the insertion holes 25, 39 sequentially, together with the compression spring 43. The terminal 45 is stopped from separating by the top plate portion 38 at a position below the insertion hole 39. The upper terminal of the cable 44 is connected to the adjustment dial 46, which is exposed into the passenger compartment (for example, onto the door trim). The upper terminal of the cable 44 is adapted to be capable of selectively increasing and decreasing the distance between the top plate portion 24 and the terminal 45 in the height direction of the vehicle through turning of the adjustment dial 46. That is, when the adjustment dial 46 is turned in one direction to decrease the distance between the top plate portion 24 and the terminal 45, the adjustment member 130, which is urged downward by the compression spring 43, is raised with respect to the guide member 20. When the adjustment dial 46 is turned in the reverse direction to increase the distance between the top plate portion 24 and the terminal 45, the adjustment member 130 is lowered with respect to the guide member 20. At this time, movement of the adjustment member 130 is guided through slide of the guide pins 41, 42 in the associated guide holes 23. The adjustment dial 46 may be configured in any suitable manner as long as the adjustment dial 46 has a known mechanism that is turned to selectively wind and unwind the cable 44.

Next, the stopper portions 115 and the inclined portions 132 of the adjustment walls 131 will be described. As illustrated in an enlarged state in FIG. 11A, each of the stopper portions 115 has check-side step portions 115a of multiple stages in the movement direction of the check link 11. Through the check-side step portions 115a, the front end surface of the stopper portion 115 bulges forward (in the movement direction of the check link 11) in a stepped manner in a downward direction. Each of the check-side step portions 115a bulges by a predetermined length with respect to an adjacent one of the check-side step portions 115a. The dimensions of the check-side step portions 115a in the height direction of the vehicle are all set equal to one another.

On the other hand, the inclined portion 132 of each adjustment wall 131 has adjustment-side step portions 132a of multiple stages in the movement direction of the check link 11. The number of the adjustment-side step portions 132a is greater than the number of the check-side step portions 115a. Through the adjustment-side step portions 132a, the inclined portions 132 bulge rearward (in the movement direction of the check link 11) in a stepped manner in an upward direction. Each of the adjustment-side step portions 132a bulges by the aforementioned predetermined length with respect to the adjacent one of the adjustment-side step portions 132a. The dimensions of the adjustment-side step portions 132a in the height direction of the vehicle are all set equal to the dimension of each check-side step portion 115a in the height direction of the vehicle. That is, as represented by the long dashed double-short dashed lines in FIG. 11A, the adjustment-side step portions 132a of multiple stages are allowed to contact the check-side step portions 115a of a multiple stages in an engaged state by adjusting the position of each inclined portion 132 (the adjustment member 130) in the height direction of the vehicle.

Figure 11A:
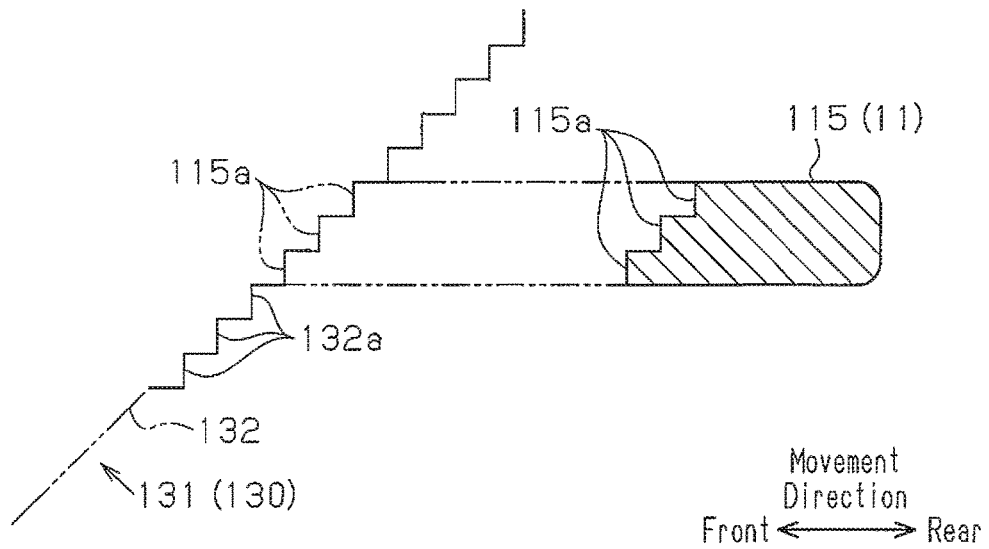
FIGS. 11A and 11B are enlarged views each showing check-side step portions and adjustment-side step portions.
Figure 11B:
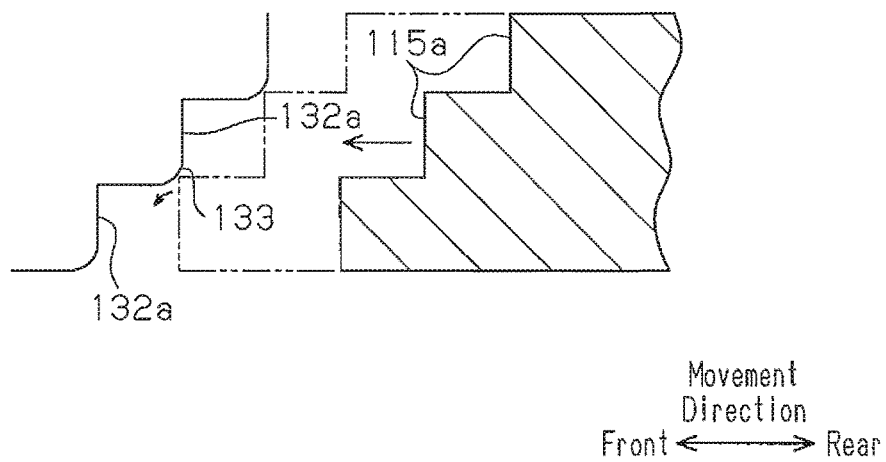

Particularly, as shown in a further enlarged state in FIG. 11B, a substantially arcuate chamfered portion 133 serving as a guide portion is provided in a bulging corner portion of each adjustment-side step portion 132a. Therefore, when the check link 11 is moved forward to engage the check-side step portions 115a of multiple stages with the adjustment-side step portions 132a and corner portions of the check-side step portions 115a and corresponding corner portions of the adjustment-side step portions 132a face and contact one another, the corner portions of the check-side step portions 115a are guided by the chamfered portions 133. This ensures smooth engagement between the check-side step portions 115a and the adjustment-side step portions 132a.

Operation of the second embodiment will hereafter be described.

Figure 12A:
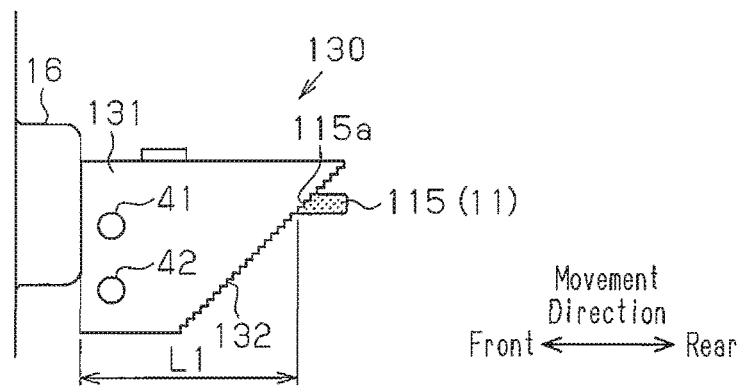
FIGS. 12A and 12B are side views illustrating operation of the second embodiment.

As shown in FIG. 12A, the adjustment dial 46 may be turned to adjust the position of the adjustment member 130 to the lowermost position of the movement range of the adjustment member 130. An upper end of each inclined portion 132 is thus arranged on a forward movement path of the check link 11. In this state, an opening operation of the door 4 is restricted by contact between the stopper portions 115 of the check link 11, which is retracted from inside the door 4 in correspondence with the opening operation, and the upper ends of the corresponding inclined portions 132. At this time, the length L of the check link 11, which projects from the door check 16 into the door 4, is the length L1. The opening operation of the door 4 is thus restricted at a first opening degree.

Figure 12B:
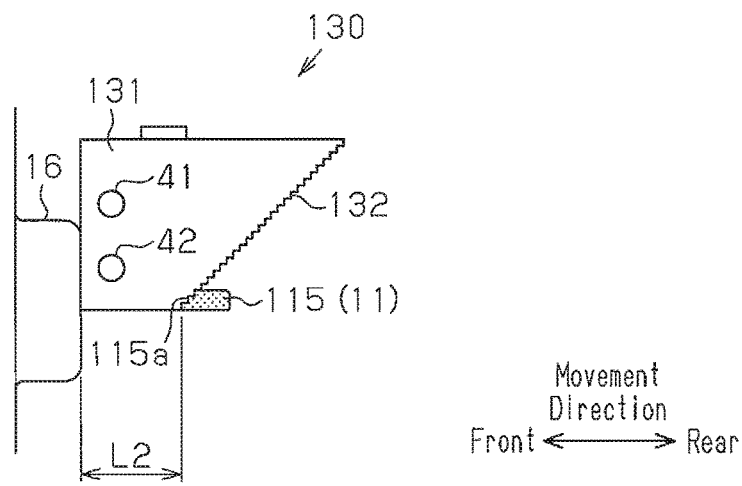

Referring to FIG. 12B, the adjustment dial 46 may be turned to adjust the position of the adjustment member 130 such that the lower end of each inclined portion 132 is arranged on a forward movement path of the check link 11. In this state, an opening operation of the door 4 is restricted by contact between the stopper portions 115 of the check link 11, which is retracted from inside the door 4 in correspondence with the opening operation, and the lower ends of the corresponding inclined portions 132. At this time, the length L of the check link 11, which projects from the door check 16 into the door 4, is the length L2 (L2<L1). The opening operation of the door 4 is thus restricted at a second opening degree, which is greater than the first opening degree.

The stopper portions 115 and the inclined portions 132 are set such that, at the aforementioned two positions at which the adjustment member 130 restricts the opening operation of the door 4, the check-side step portions 115a contact the corresponding adjustment-side step portions 132a in an engaged state. That is, the distance covered by the upward movement of the adjustment member 130 represented by the change from FIG. 12A to FIG. 12B is an integral multiple of the dimension of each check-side step portion 115a (or each adjustment-side step portion 132a) in the height direction of the vehicle. Even if the adjustment member 130 is located at a certain position between the positions of FIGS. 12A and 12B, the opening operation of the door 4 is restricted in a state in which the check-side step portions 115a are engaged with the corresponding adjustment-side step portions 132a as in the above-described case, as long as the distance covered by the upward movement of the adjustment member 130 from the state shown in FIG. 12A is an integral multiple of the dimension of each check-side step portion 115a (or each adjustment-side step portion 132a) in the height direction of the vehicle. In other words, it is preferable that, when adjusting the position of the adjustment member 130, the adjustment dial 46 be turned with clicking sensation in correspondence with the dimension of each check-side step portion 115a in the height direction of the vehicle.

By turning the adjustment dial 46 to adjust the position of the adjustment member 130 such that the adjustment member 130 is located above the door check 16, the opening operation of the door 4 is restricted by contact between the stopper portions 115 of the check link 11, which is retracted from inside the door 4 in correspondence with the opening operation, and the door check 16. At this time, the length L of the check link 11, which projects from the door check 16 into the door 4 is, zero and the operation of the door 4 is restricted at the fully open position.

As described above, the present embodiment has the following advantages.

(1) In the second embodiment, the opening operation caused by pivoting of the door 4 in one direction is restricted by contact between the check-side step portions 115a of multiple stages of the stopper portions 115 and the corresponding ones of the adjustment-side step portions 132a of the adjustment member 130 in an engaged state. The maximum opening degree of the door 4 is adjusted by moving the adjustment member 130 to change those of the adjustment-side step portions 132a of multiple stages that the check-side step portions 115a of multiple stages of the stopper portions 115 contact in the engaged state. In this case, by contact with the stopper portions 115, the adjustment member 130 further firmly restricts opening of the door exceeding an adjusted angle. Particularly, the check-side step portions 115a of multiple stages of the stopper portions 115 contact the corresponding ones of the adjustment-side step portions 132a of multiple stages of the adjustment member 130 in an engaged state. As a result, even if the step portions 115a, 132a are significantly reduced in size, its influence on restriction of the door 4 is restrained. The opening degree of the door 4 is thus adjusted with improved precision.

(2) In the second embodiment, the door 4 is restricted further reliably by guiding the contact between the check-side step portions 115a and the corresponding adjustment-side step portions 132a in an engaged state by means of the chamfered portions 133.

(3) In the second embodiment, to hold the check link 11 in the width direction of the vehicle (the parallel-arrangement direction, which is different from the movement direction of the check link 11 and the movement direction of the adjustment member 130), the adjustment member 130 includes the pair of the adjustment walls 131, in which the adjustment-side step portions 132a of multiple stages are arranged. The check link 11 has the pair of the stopper portions 115 such that each of the stopper portions 115 contacts the corresponding one of the adjustment walls 131. The opening operation caused by pivoting of the door 4 in one direction is thus restricted by contact between the stopper portions 115 (the check-side step portions 115a of multiple stages) of the check link 11 and the corresponding adjustment walls 131 (the corresponding ones of the adjustment-side step portions 132a of multiple stages). This further firmly restricts opening of the door 4 exceeding an adjusted angle. In this case, the contact between the stopper portions 115 and the corresponding adjustment walls 131, between which the check link 11 is held in the width direction of the vehicle, allows the check link 11 to further stabilize the posture of the check link 11.

(4) In the second embodiment, by adjusting the maximum opening degree of the door 4, the door 4 is opened safely even in, for example, a narrow space.

Third Embodiment

A third embodiment of the door opening degree adjustment device will now be described with reference to FIG. 13. The third embodiment is configured differently from the second embodiment in that the maximum opening degree of the door 4 is adjusted automatically in correspondence with the surrounding circumstances. Therefore, detailed description of similar parts is omitted herein.

Figure 13:
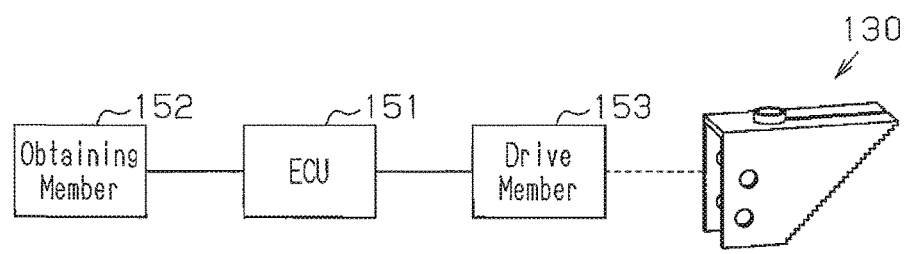
FIG. 13 is a block diagram representing the electric configuration of a third embodiment.

With reference to FIG. 13, the door opening degree adjustment device includes an electronic control unit (ECU) 151 serving as a control member configured mainly by, for example, a microcomputer, an obtaining member 152 electrically connected to the ECU 151, and a drive member 153. The obtaining member 152 is configured by, for example, a distance sensor or a camera. The obtaining member 152 obtains the spacing distance between the door 4 and an obstacle outside the door 4 and outputs an information signal representing the spacing distance to the ECU 151. The obtaining member 152 may be, for example, a communication device capable of receiving information regarding the surrounding circumstances from road-side facilities. The drive member 153 is configured by, for example, an electric motor and mechanically linked to the adjustment member 130 such that the drive member 153 is capable of moving the adjustment member 130. The drive member 153 moves the adjustment member 130 based on a drive signal output by the ECU 151.

In this configuration, the ECU 151 calculates the opening degree of the door 4 corresponding to the obtained spacing distance based on the information signal provided by the obtaining member 152. The ECU 151 also calculates the position of the adjustment member 130 that enables restriction of an opening operation of the door without exceeding the calculated opening degree. Then, to move the adjustment member 130 to the calculated position, the ECU 151 outputs the drive signal to the drive member 153. The adjustment member 130 is thus moved such that the maximum opening degree of the door 4 becomes the opening degree of the door 4 corresponding to the obtained spacing distance.

As has been described in detail, the third embodiment has the advantages described below in addition to the same advantages as those of the second embodiment.

(1) In the third embodiment, the ECU 151 moves the adjustment member 130 in a preferred manner to ensure the opening degree of the door 4 corresponding to the obtained spacing distance, or, in other words, to avoid interference with the obstacle outside the door 4.

(2) The third embodiment eliminates complication caused by, for example, precise manual movement of the adjustment member 130.

Each of the above illustrated embodiments may be modified as follows.

Figure 14:
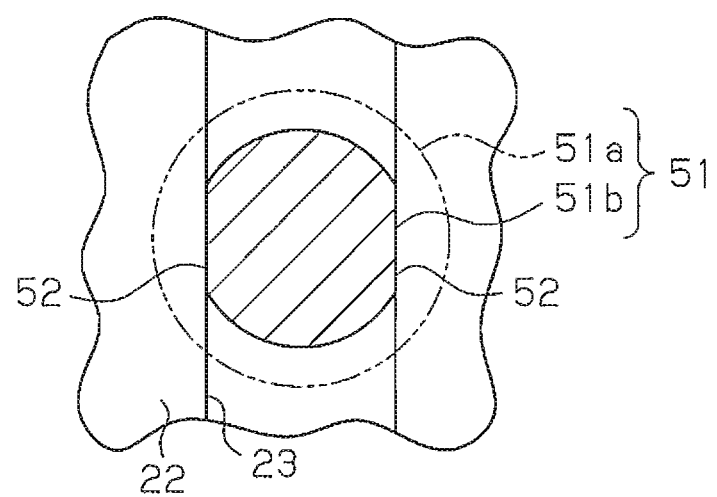
FIG. 14 is a schematic view showing a modification.

In each of the illustrated embodiments, as illustrated in FIG. 14, a guide pin 51 having a substantially disk-shaped head portion 51a and a substantially flattened columnar inserting portion 51b may be employed. The head portion 51a has a diameter greater than the opening width of each guide hole 23 in the transverse direction. The inserting portion 51b projects from a central portion of the head portion 51a and is inserted into the guide hole 23. That is, outer peripheral sections are removed from the pillar shape such that the inserting portion 51b has a pair of opposed parallel flat sections 52 at the positions at which the inserting portion 51b slidably contacts the guide hole 23. In this case, the load input from the stopper portions 15 to the step portions 34a, 35a is supported by the guide pin 51 and the guide hole 23 through the surfaces of the flat sections 52. This increases the holding strength compared to, for example, a case in which the load concentrates on a single point. As long as the guide pin has a shape having a pair of parallel flat sections at the positions at which the guide pin slidably contacts the guide hole 23 (a shape having a width across flat), the guide pin may be formed in, for example, a substantially rectangular or hexagonal pillar shape.

In each of the illustrated embodiments, any suitable manipulation member such as a lever may replace the adjustment dial 46 as long as the manipulation member is manipulated to selectively extend and contract the cable 44. In a case including an actuator that electrically extends and contracts the cable 44, a manipulation switch manipulated to drive the actuator may be employed. In this case, the location for installing the manipulation switch is not restricted to a location in the door trim but may be a location in any suitable portion of the vehicle, such as the dashboard. Further, in a case including an obtaining member (such as a distance sensor or a camera) that obtains the spacing distance between the door 4 and an obstacle outside the door 4, driving of an actuator may be controlled in correspondence with the obtained spacing distance by means of a control device such as a microcomputer.

In the first embodiment, as long as the adjustment walls 31 of the adjustment member 30 are located inward with respect to the stopper portions 15 of the check link 11, the extended pieces (34, 35) may be non-bent in the width direction of the vehicle. That is, the extended pieces 34, 35 may extend linearly without being bent in an L shape. In this case, a rear end surface of each of the non-bent extended pieces forms a step portion. Also, the distance between the adjustment walls 31 in the width direction of the vehicle may be increased at a position above the upper step portions to form an upper escape portion and at a position below the lower step portions to form a lower escape portion.

In each of the illustrated embodiments, one of the stopper portions 15, 115 of the check link 11 may be omitted. In this case, the adjustment member may be configured to have only the corresponding one of the adjustment walls 31, 131, which the remaining one of the stopper portions 15, 115 is capable of contacting. Similarly, the guide member may be configured to have only the corresponding one of the support walls having the guide hole in which the guide pin (the guide projection) arranged in the remaining one of the adjustment walls is inserted.

Although the adjustment member 30, 130 is moved upward to release the adjustment member 30, 130 from the stopper portions 15, 115 in each of the illustrated embodiments, the adjustment member 30, 130 may be moved downward, for example.

In each of the illustrated embodiments, the extending direction of each guide hole 23 of the guide member 20, which is the movement direction of the adjustment member 30, 130 with respect to the guide member 20, is not restricted to the height direction of the vehicle but may be, for example, the width direction of the vehicle. In this case, the parallel-arrangement direction of the adjustment walls 31, 131, between which the check link 11 is held, may correspond to, for example, the height direction of the vehicle.

In each of the illustrated embodiments, the door check 16 may be arranged between the wall portion 8 of the door 4 and the guide member 20 (the attaching wall 21).

In each of the illustrated embodiments, the door check 16 may be omitted. In this case, the fully open position of the door 4 may be defined by the adjustment member 30, 130.

In each of the illustrated embodiments, the attaching wall 21 of the guide member 20 may be omitted. In this case, the support wall 22 may be, for example, fixed to the door 4 using a suitable fixing member.

In each of the illustrated embodiments, the guide pins 41, 42 may be integrally formed with the adjustment member 30, 130 as guide projections.

In the first embodiment, each adjustment wall 31 of the adjustment member 30 may have three or more step portions. That is, the number of the step portions of the adjustment member may be three or greater. Also, the number of the step portions of the adjustment member and the number of the guide projections (the guide pins) inserted in the corresponding guide holes may be different from each other. That is, any suitable configuration may be employed as long as at least one of multiple guide projections is arranged on the extended line that connects the corresponding stopper portion to one of the stages of step portions that contacts the stopper portion in the movement direction of the check link 11.

It is preferable that the opening degree of the door 4 adjusted in correspondence with the step portion that the stopper portion contacts when the guide projection is arranged on the aforementioned extended line correspond to a frequently used opening degree. If opening degrees of the door 4 are used with similar frequencies, the guide projection may be arranged on, for example, the extended line that connects the stopper portion to the step portions at the opposite ends that the stopper portion contacts in the movement direction of the check link 11.

In each of the illustrated embodiments, the upper end or the lower end of each guide hole 23 may be open.

In each of the illustrated embodiments, the cable 44 may be replaced by, for example, a push-pull cable. In this case, the compression spring 43 may be omitted.

In each of the illustrated embodiments, when the guide pins 41 are located at the upper ends of the corresponding guide holes 23, the stopper portions 15 are located below the adjustment member 30. However, the stopper portions 15 may be located at any suitable positions as long as at least the stopper portions 15 are located below the extended pieces 35.

In the first embodiment, the cable 44 is coupled to the top plate portion 38 of the adjustment member 30. However, for example, the top plate portion 38 may be omitted and a bottom plate portion that connects the adjustment walls 31 to each other may be arranged in a lower section of the adjustment member 30. The cable 44 is coupled to the bottom plate portion. In this case, the lower escape portion (30*b*) is formed by the space defined between the adjustment walls 31 at a position below the step portions 35*a* and above the bottom plate portion. The upper escape portion (30*a*) may include the range above the adjustment walls 31.

In each of the illustrated embodiments, one of the guide pins 41, 42 may be omitted.

In the first embodiment, one of the upper escape portion 30*a* and the lower escape portion 30*b* may be omitted.

In the first embodiment, if the upper escape portion 30*a* or the lower escape portion 30*b* is ensured, the guide pin 41, 42 does not necessarily have to be arranged on the corresponding extended line E1, E2, which connects the stopper portion 15 to the step portion 34*a*, 35*a* that the stopper portion 15 contacts in the movement direction of the check link 11.

In the first embodiment, if the guide pins 41, 42 are respectively arranged on the extended lines E1, E2, which connect the stopper portions 15 to the step portions 34*a*, 35*a* that the stopper portions 15 contact in the movement direction of the check link 11, the upper escape portion 30*a* and the lower escape portion 30*b* may both be omitted.

In each of the illustrated embodiments, the relationship between the locations of the guide member 20 and the adjustment members 30, 130 and the locations of the guide holes 23 and the guide pins 41, 42 may be reversed.

In the first embodiment, the step portions 34*a* or the step portions 35*a* may be omitted. That is, the number of the stages of the step portions of the adjustment member may be one.

In each of the illustrated embodiments, the compression spring 43 may be replaced by an urging member configured by, for example, a leaf spring.

In each of the illustrated embodiments, the ends of the movement range of the adjustment member 30, 130 with respect to the guide member 20 are determined by locating each guide pin 41, 42 at the corresponding end of the guide hole 23. However, for example, any suitable stopper piece may be cut and raised from the guide member 20 or a stopper member may be arranged separately. The stopper member may be engaged with the adjustment member 30, 130 to determine the ends of the movement range of the adjustment member 30, 130.

Particularly, when the cable 44 flexes as shown in FIG. 7B, the compression spring 43 is compressed between the guide member 20 and the adjustment member 30 maximally in the axial direction. Using the corresponding maximally decreased length of the compression spring 43, the movement range of the adjustment member 30 with respect to the guide member 20 may be determined.

In each of the illustrated embodiments, guiding of movement of the adjustment member by the guide member may be performed using a rail and a shoe, which are arranged in one of the guide member and the adjustment member and the other one of the guide member and the adjustment member, respectively, such that the rail and the shoe are engaged with each other.

In each of the illustrated embodiments, in a case including a sensor that detects a car crash, for example, a cutting member that cuts the cable 44 when the car crash is detected may be arranged. Alternatively, in the first embodiment, a winding member that winds the cable 44 such that the escape portion (30*b*) reaches the stopper portions 15 may be arranged. Further, in each of the illustrated embodiments, a portion that cuts the cable 44 when the door 4 is deformed due to a car crash may be arranged in the door 4 or a projection capable of inducing flexion of the cable 44 may be arranged in the door 4.

In the second embodiment, as long as the cable 44 is selectively extended and contracted with clicking sensation in correspondence with the dimension of each check-side step portion 115*a* in the height direction of the vehicle, the adjustment dial 46 may be replaced by any other suitable manipulation member such as a lever.

In the third embodiment, a manipulation switch by which movement of the adjustment member 130 is manipulated may be electrically connected to the ECU 151 such that, regardless of the spacing distance between the door 4 and an obstacle outside the door 4, the user is allowed to adjust the maximum opening degree of the door 4 as needed by manipulating the manipulation switch. In this case, the location for installing the manipulation switch is not restricted to a location in the door trim but may be a location in any suitable portion of the vehicle such as the dashboard.

In the third embodiment, the link structure between the drive member 153 and the adjustment member 130 may be the cable 44 and a drum capable of selectively winding and unwinding the cable 44. Alternatively, the cable 44 may be replaced by a rack coupled to the adjustment member 130 and a pinion meshed with the rack.

In the second and third embodiments, those of the adjustment-side step portions 132*a* that are located above those of the adjustment-side step portions 132*a* with which the check-side step portions 115*a* are engaged, in a state in which the adjustment member 130 is located at the lowermost position, may be omitted. In this case, those of the adjustment-side step portions 132*a* may be arranged upright in the height direction of the vehicle.

In the second and third embodiments, the upper end of each inclined portion 132 may be arranged on a forward movement path of the check link 11 when the adjustment member 130 is located at the lowermost position.

In the second and third embodiments, either instead of or in addition to the chamfered portions 133 of the adjustment-side step portions 132*a*, similar chamfered portions may be provided in the check-side step portions 115*a*. Alternatively, the chamfered portions 133 may be omitted from the adjustment-side step portions 132*a*.

The present invention may be employed in, for example, a door arranged in a rear section of a vehicle.

The invention claimed is:

1. A door opening degree adjustment device comprising:
   a check link configured to be pivotally coupled to a body of a vehicle and to be extended into a door pivotally coupled to the body, wherein the check link has a stopper portion in a distal end;
   a guide member configured to be fixed in the door, wherein the guide member includes a guide hole extending in a direction different from a direction of movement of the check link caused by pivoting of the door; and
   an adjustment member, wherein
   the adjustment member includes
      a plurality of stages of step portions, and
      a guide pin that is inserted in the guide hole movably in the extending direction of the guide hole,
   the adjustment member causes the stopper portion to contact the step portions of any one of the stages, thereby restricting an opening operation caused by pivoting of the door in one direction, and
   the guide pin is arranged on an extended line that connects the stopper portion to one of the stages of the step portions that contacts the stopper portion in the direction of the movement of the check link.

2. The door opening degree adjustment device according to claim 1, wherein
   the adjustment member is arranged movably in a direction different from the direction of the movement of the check link caused by pivoting of the door,
   the stopper portion has a plurality of stages of check-side step portions in the direction of the movement of the check link,
   the adjustment member has a plurality of stages of adjustment-side step portions, wherein the number of stages of the adjustment-side step portions is greater than the number of stages of the check-side step portions, and
   the adjustment member causes the stages of the check-side step portions to contact the stages of the adjustment-side step portions in an engaged state, thereby restricting the opening operation caused by pivoting of the door in the one direction.

3. The door opening degree adjustment device according to claim 1, wherein
   movement of the adjustment member in a direction different from the direction of the movement of the check link caused by pivoting of the door is guided in a predetermined movement range by the guide member, and
   the door opening degree adjustment device comprises:
      an urging member that urges the adjustment member such that the adjustment member moves toward one of ends of the predetermined movement range, and
      a cable coupled to the adjustment member, wherein, against urging force of the urging member, the cable holds the adjustment member at a position corresponding to a manipulation amount, and
      the adjustment member has an escape portion that releases the stopper portion when located at the end.

4. The door opening degree adjustment device according to claim 1, wherein
   movement of the adjustment member in a direction different from the direction of the movement of the check link caused by pivoting of the door is guided in a predetermined movement range by the guide member, and
   the door opening degree adjustment device comprises:
      an urging member that urges the adjustment member such that the adjustment member moves toward a first end, which is one of ends of the predetermined movement range; and a cable coupled to the adjustment member, wherein, against urging force of the urging member, the cable holds the adjustment member at a position corresponding to a manipulation amount, and the adjustment member has an escape portion that releases the stopper portion when located at a second end, which is the other end of the predetermined movement range.

5. The door opening degree adjustment device according to claim 1, wherein the guide projection has a flat section at a position at which the guide pin slidably contacts the guide hole.

6. The door opening degree adjustment device according to claim 1, wherein the guide member has an attaching wall that is held in contact with and attached to a wall portion of the door through which the check link is inserted.

7. The door opening degree adjustment device according to claim 6, comprising a door check that is held in contact with and attached to the attaching wall, wherein
   the check link is inserted through the door check, and
   the door check is caused to contact the stopper portion in a state released from the adjustment member, thereby restricting the opening operation caused by pivoting of the door in the one direction at a fully open position.

8. The door opening degree adjustment device according to claim 1, wherein
   the adjustment member has a pair of adjustment walls,
   the adjustment walls have the stages of the step portions and the guide pin such that the check link is allowed to be held between the adjustment walls in a parallel-arrangement direction that is different from the direction of the movement of the check link and the extending direction of the guide hole,
   the guide member has a pair of support walls having the guide hole such that the adjustment member is held between the support walls in the parallel-arrangement direction, and
   the check link has a pair of the stopper portions such that each of the stopper portions is allowed to contact any one of the stages of the step portions of the adjustment walls.

9. A door opening degree adjustment device comprising:
   a check link configured to be pivotally coupled to a body of a vehicle and to be extended into a door pivotally coupled to the body, wherein the check link has a stopper portion in a distal end;
   a guide member configured to be fixed in the door;
   an adjustment member having a step portion, wherein movement of the adjustment member in a predetermined movement range in a direction different from a direction of movement of the check link caused by pivoting of the door is guided by the guide member, and
   the adjustment member restricts an opening operation caused by pivoting of the door in one direction by causing the stopper portion to contact the step portion;
   an urging member that urges the adjustment member such that the adjustment member moves toward one of ends of the predetermined movement range; and
   a cable coupled to the adjustment member, wherein, against urging force of the urging member, the cable holds the adjustment member at a position corresponding to a manipulation amount, wherein
   the adjustment member has an escape portion that releases the stopper portion when located at the end,
   one of a guide hole extending in the direction of movement of the adjustment member and a guide pin movably inserted in the guide hole is arranged in the guide member,
   the other one of the guide hole and the guide pin is arranged in the adjustment member, and
   the end is determined by locating the guide pin at one of ends of the guide hole.

10. A door opening degree adjustment device comprising:
    a check link configured to be pivotally coupled to a body of a vehicle and to be extended into a door pivotally coupled to the body, the check link having a stopper portion in a distal end;
    a guide member configured to be fixed in the door;
    an adjustment member including a step portion, wherein movement of the adjustment member in a predetermined movement range in a direction different from a direction of movement of the check link caused by pivoting of the door is guided by the guide member, and
    the adjustment member restricts an opening operation caused by pivoting of the door in one direction by causing the stopper portion to contact the step portion;
    an urging member that urges the adjustment member such that the adjustment member moves toward a first end, which is one of ends of the predetermined movement range; and
    a cable coupled to the adjustment member, wherein, against urging force of the urging member, the cable holds the adjustment member at a position corresponding to a manipulation amount, wherein
    the adjustment member has an escape portion that releases the stopper portion when located at a second end, which is the other end of the predetermined movement range,
    one of a guide hole extending in the direction of movement of the adjustment member and a guide pin movably inserted in the guide hole is arranged in the guide member,
    the other one of the guide hole and the guide pin is arranged in the adjustment member, and
    the first end and the second end are determined by locating the guide pin at one of ends of the guide hole and the other end, respectively.

* * * * *